United States Patent
Campbell et al.

(10) Patent No.: US 9,971,708 B2
(45) Date of Patent: May 15, 2018

(54) SYSTEM AND METHOD FOR APPLICATION MIGRATION BETWEEN DOCKING STATION AND DOCKABLE DEVICE

(71) Applicant: Advanced Micro Devices, Inc., Sunnyvale, CA (US)

(72) Inventors: Jonathan Lawrence Campbell, Orlando, FL (US); Yuping Shen, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 168 days.

(21) Appl. No.: 14/956,511

(22) Filed: Dec. 2, 2015

(65) Prior Publication Data
US 2017/0161212 A1   Jun. 8, 2017

(51) Int. Cl.
| | | |
|---|---|---|
| *G06F 13/00* | (2006.01) | |
| *G06F 13/12* | (2006.01) | |
| *G06F 13/40* | (2006.01) | |
| *G06F 1/16* | (2006.01) | |

(52) U.S. Cl.
CPC .......... *G06F 13/126* (2013.01); *G06F 1/1632* (2013.01); *G06F 13/4081* (2013.01)

(58) Field of Classification Search
CPC ... G06F 13/126; G06F 1/1632; G06F 13/4081
See application file for complete search history.

(56) References Cited

U.S. PATENT DOCUMENTS

| | | | |
|---|---|---|---|
| 6,549,968 B1 * | 4/2003 | Hart ..................... | G06F 9/4401 710/303 |
| 7,426,721 B1 * | 9/2008 | Saulpaugh .............. | H04L 67/16 717/143 |
| 8,717,371 B1 | 5/2014 | Wyatt | |
| 2010/0217912 A1 * | 8/2010 | Rofougaran ........ | H04M 1/7253 710/304 |
| 2010/0250789 A1 * | 9/2010 | Collopy ................ | G06F 1/1616 710/13 |
| 2012/0113091 A1 * | 5/2012 | Isaacson ............... | G06T 15/005 345/418 |
| 2013/0080969 A1 * | 3/2013 | Reeves ................ | G06F 1/1616 715/788 |

(Continued)

OTHER PUBLICATIONS

International Search Report dated Dec. 19, 2016.

*Primary Examiner* — Jing-Yih Shyu
(74) *Attorney, Agent, or Firm* — Volpe and Koenig, P.C.

(57) ABSTRACT

Described is a method and apparatus for application migration between a dockable device and a docking station in a seamless manner. The dockable device includes a processor and the docking station includes a high-performance processor. The method includes determining a docking state of a dockable device while at least an application is running. Application migration from the dockable device to a docking station is initiated when the dockable device is moving to a docked state. Application migration from the docking station to the dockable device is initiated when the dockable device is moving to an undocked state. The application continues to run during the application migration from the dockable device to the docking station or during the application migration from the docking station to the dockable device.

18 Claims, 3 Drawing Sheets

(56) References Cited

U.S. PATENT DOCUMENTS

| | | | |
|---|---|---|---|
| 2013/0104051 A1* | 4/2013 | Reeves | G06F 1/1616 |
| | | | 715/748 |
| 2013/0166790 A1 | 6/2013 | Lee et al. | |
| 2013/0181998 A1 | 7/2013 | Malakapalli et al. | |
| 2013/0207984 A1 | 8/2013 | Walrath | |
| 2013/0245882 A1* | 9/2013 | Ricci | B60K 35/00 |
| | | | 701/36 |
| 2014/0055465 A1 | 2/2014 | Diercks et al. | |
| 2015/0095598 A1* | 4/2015 | Abou Gazala | G06F 9/46 |
| | | | 711/162 |
| 2016/0041931 A1* | 2/2016 | Gupta | G06F 9/4856 |
| | | | 710/8 |
| 2016/0070670 A1* | 3/2016 | Engelen | H04L 63/105 |
| | | | 710/46 |

* cited by examiner

SYSTEM AND METHOD FOR APPLICATION MIGRATION BETWEEN DOCKING STATION AND DOCKABLE DEVICE

TECHNICAL FIELD

The disclosed embodiments are generally directed to graphics systems and methods, and in particular, to detachable graphics systems and methods.

BACKGROUND

Detachable or switchable graphics is a technology that utilizes both the graphical processing capabilities of a high-performance discrete graphics processing unit (GPU) and the power efficiency of an integrated GPU. In general, detachable graphics technology engages the discrete GPU only when it is needed for 3D applications, and uses the integrated GPU capabilities the rest of the time.

However, adding a discrete GPU to a system while applications are running requires applications to restart to take advantage of a newly available discrete GPU and similarly, removing a discrete GPU from a system while applications are running on the discrete GPU requires the applications to close before the discrete GPU can be removed. Moreover, current systems require explicit user interaction for removing a GPU, and a new GPU added to a system will not be used until a 3D application is restarted, (which requires user knowledge and application restart).

SUMMARY OF EMBODIMENTS

Described is a method and apparatus for application migration between a dockable device and a docking station in a seamless manner. The dockable device includes a processor and the docking station includes a high-performance processor. The method includes determining a docking state of a dockable device while at least an application is running. Application migration from the dockable device to a docking station is initiated when the dockable device is moving to a docked state. Application migration from the docking station to the dockable device is initiated when the dockable device is moving to an undocked state. The application continues to run during the application migration from the dockable device to the docking station or during the application migration from the docking station to the dockable device.

BRIEF DESCRIPTION OF THE DRAWINGS

A more detailed understanding may be had from the following description, given by way of example in conjunction with the accompanying drawings wherein.

DETAILED DESCRIPTION OF THE EMBODIMENTS

Detachable graphics systems may be implemented in a multiplicity of ways. For example, dockable devices, such as tablets, laptops, notebooks and other similar devices, are or will be available that can dock with docking stations that include a discrete graphics processing unit (dGPU). In general, when a dockable device is docked, applications can run on the dGPU if specified by a detachable graphics profile, such as AMD's PowerXpress (PX) profile. Although reference is made to PX profiles, other detachable graphics profile solutions or implementations are equally applicable. The applications running on the dGPU are migrated to an integrated GPU or accelerated processing unit (APU) when the dockable device is undocked from the docking station. The applications will be migrated back to the dGPU when the dockable device is re-docked with the docking station. A mechanical lock will be used to prevent undocking before the migration process is complete. A kernel mode driver (KMD) will allow the lock to be released when there are no DirectX devices created on the dGPU. Although reference is made to DirectX in this specification, other Application Programming Interfaces (APIs) that provide access to the capabilities of the display and audio cards, which enable programs to provide realistic three-dimensional (3-D) graphics and immersive music and audio effects, are similarly applicable.

In the PX multi-GPU solution, 3D applications may run on either an integrated GPU to save power, or a high performance GPU for additional performance. This determination is made at application load time, so once an application loads, it always runs on the same GPU. Application migration allows a 3D application to migrate between GPUs while the application is running, (without reloading the application). This enables system form factors where the discrete/high performance GPU may be added to or removed from the system without affecting currently running 3D applications and user experience. A seamless transition between docked and undocked states is provided by maintaining all data required to recreate the 3D application state on the other GPU, as well as the transfer of required data to the other GPU. For GPU removal, it is further required that all state information be destroyed on the GPU so that the GPU may be removed, (fully migrating the application from the previous GPU to the new GPU).

Figure 1:
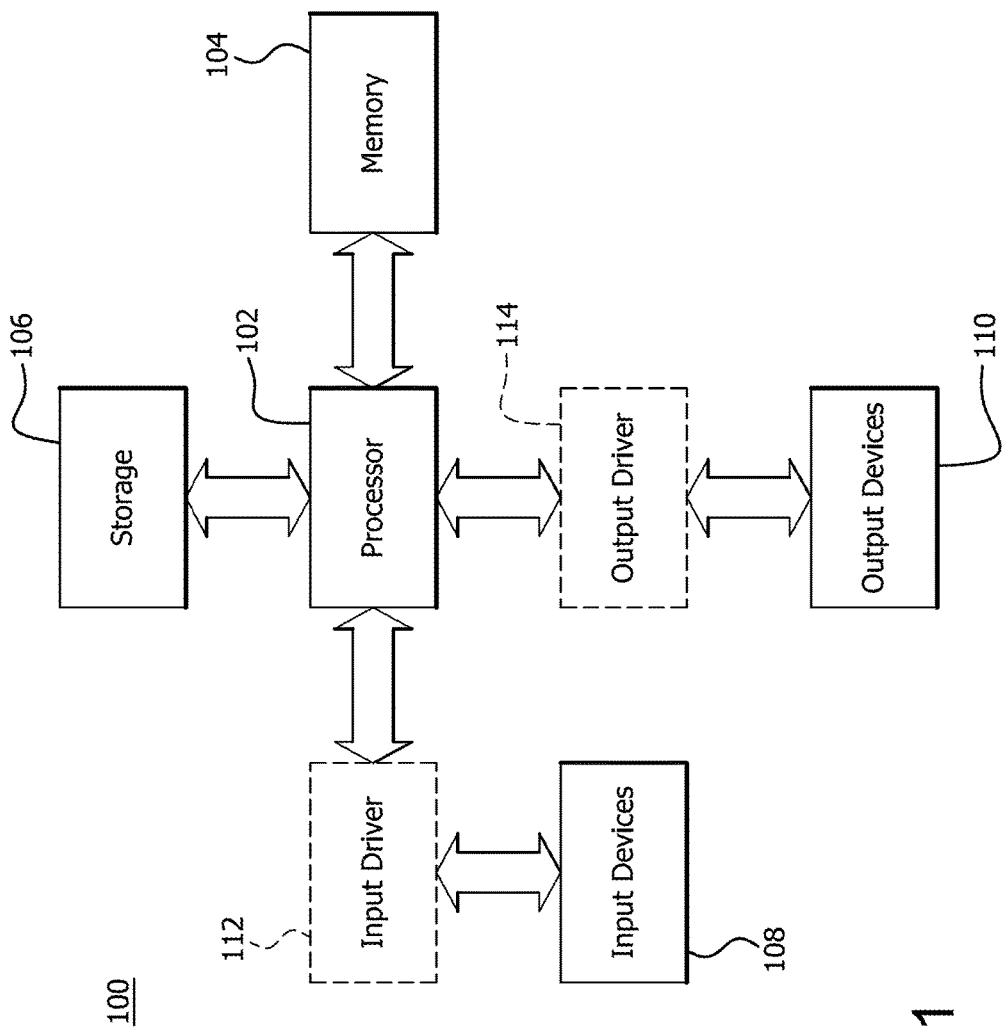
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
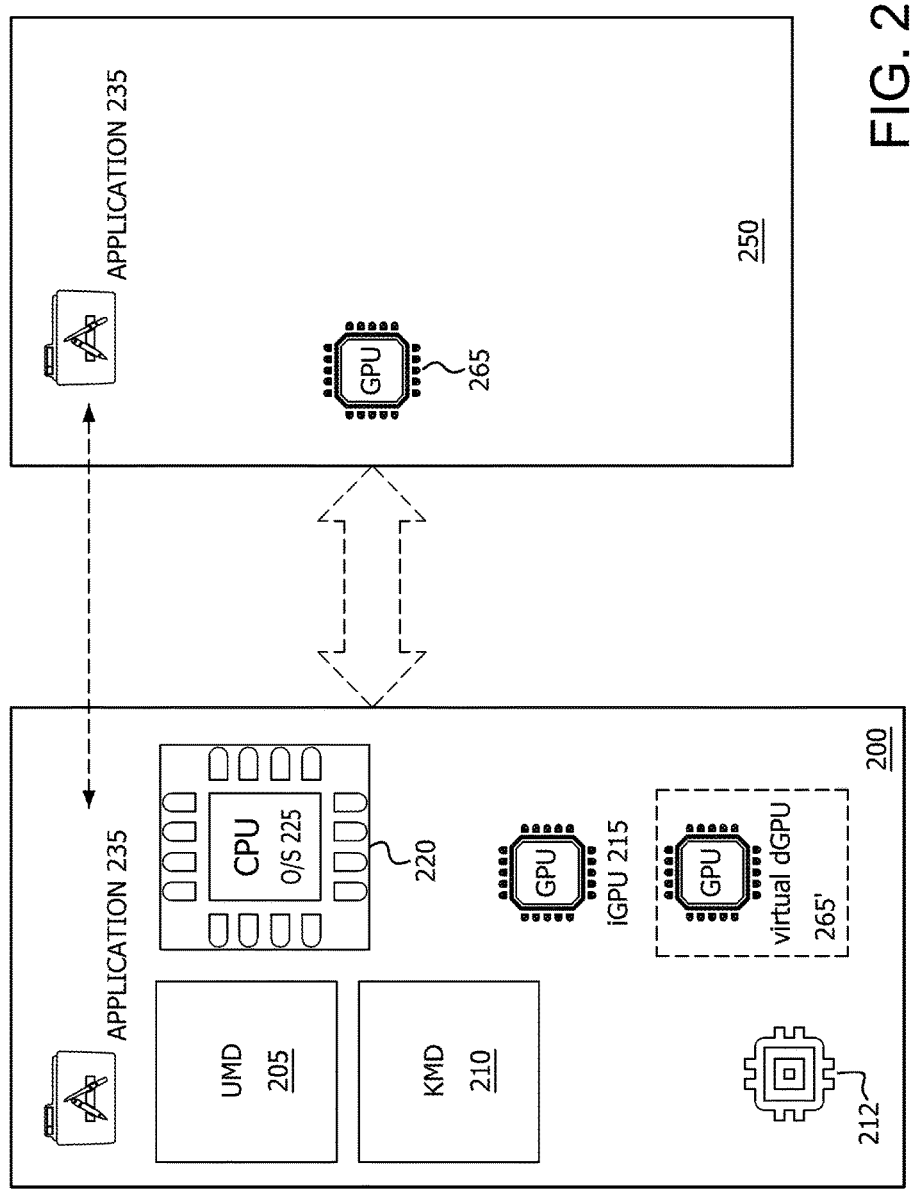
FIG. 2 is an example block diagram of a dockable device and a docking station in accordance with certain embodiments.

FIG. 2 is an example block diagram of a dockable device 200 and a docking station 250 in accordance with certain embodiments. The dockable device 200 will include a user mode driver (UMD) 205, a kernel mode driver (KMD) 210, a memory 212, an integrated GPU (iGPU) 215, and a CPU 220 including an operating system (O/S) 225. Although illustrated as an iGPU 215 and CPU 220, an accelerated processing unit (APU) may be used. An application 235 will run on the dockable device 200 when launched by a user. The docking station 250 will include a dGPU 265.

In general, in accordance with settings in a detachable graphics profile and upon driver configuration when the dockable device 200 is initially docked with the docking station 250, the O/S 225 will "see" or will be aware of the iGPU 215 and the dGPU 265. In an application migration configuration there are two states that are visible to the O/S 225 with respect to the dGPU 265. When the dockable device 200 is docked with the docking station 250, the dGPU 265 is visible to the O/S 225 in a "physical" state. The UMD 205 and KMD 210 will submit work to the dGPU 265 as needed. When the dockable device 200 is undocked with the docking station 250, the O/S 225 will see a "virtual" dGPU 265, denoted as virtual dGPU 265' in FIG. 2. The UMD 205 and the KMD 210 will ensure that there is no work submitted to the virtual dGPU 265'. It is understood that the dockable device 200 and docking station 250 may include additional components not shown in FIG. 2.

After the initial configuration, the O/S 225 will always "see" two GPUs during runtime, the iGPU 215 and either the dGPU 265 when the dockable device 200 is docked or the virtual dGPU 265' when the dockable device 200 is undocked. That is, in an undocked state, the dGPU 265 is in a virtual mode, (i.e. a logical entity and not a physical entity), with respect to the O/S 225. Since the O/S 225 always sees both GPUs, application migration is seamless between the iGPU 215 and the dGPU 265. The virtual dGPU 265' is created and treated similarly to the dGPU 265 in terms of capabilities including drivers and other such related specifications.

Figure 3:
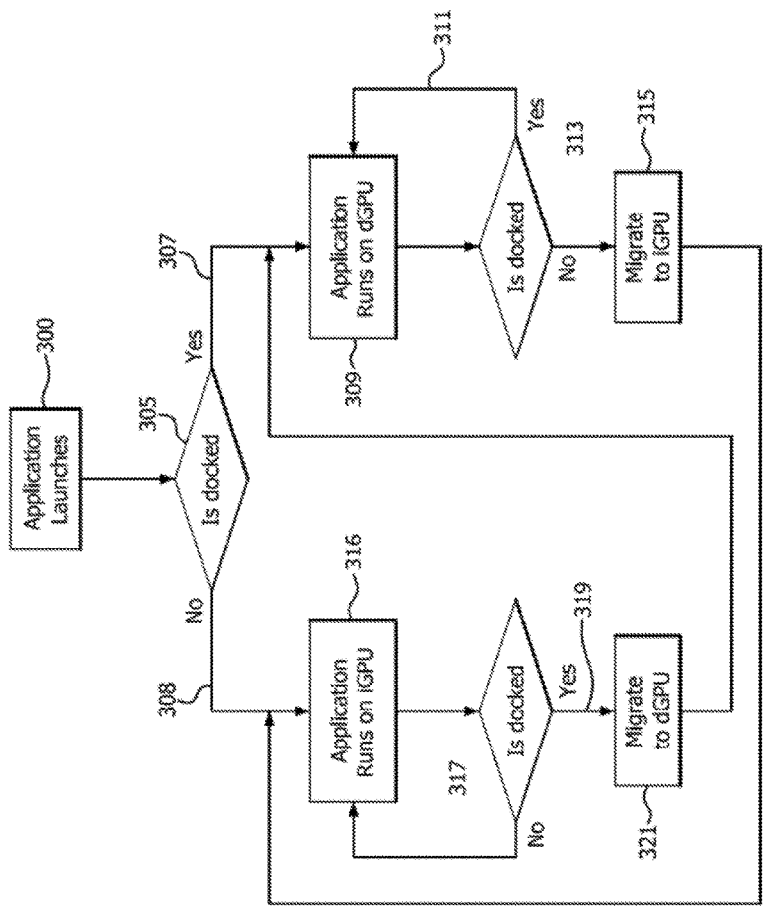
FIG. 3 is an example high level flow diagram for application migration in accordance with certain embodiments.

FIG. 3 is an example high level flow diagram for application migration in accordance with embodiments of the invention. The description herein is also with reference to FIG. 2. As an initial event, the dockable device 200 is configured with an application migration configuration upon initial docking, where the application migration configuration enables the dockable device 200 to seamlessly dock/undock with the docking device 250. The O/S 225 is made aware of the dGPU 265 and a detachable graphics profile is set such that upon detection of a docking event, application migration will be completed from the dockable device 200 to the docking station 250 and upon detection of an undocking event, application migration will be completed from the docking station 250 to the dockable device 200 as described herein below. It is noted that the detachable graphics profile is initially set by a vendor to a default GPU and that the user can override such setting to implement, for example, application migration.

After launching of an application 235 (300), the KMD 210 determines if the dockable device 200 is docked with the docking station 250 (305). If the dockable device is docked with the docking station (307), then the application 235 runs on the dGPU 250 (309). The KMD 210 continuously checks the docking status and the application 235 will continue running on the dGPU 250 (311) until the KMD 210 detects an attempt to undock the dockable device 200 from the docking station 250 (313). Upon detecting the undock request of the dockable device 200, the KMD 210 will inform or notify the UMD 205 about the undocking event (315), and lock the undock request until migration is complete. The UMD 205 will react and trigger migration across the GPUs. In particular, the UMD 205 will migrate the application 235 and all other required information and data, (as noted herein below), from the dGPU 265 in the docking station 250 to the iGPU 215 in the dockable device 200. In performing this migration, the application 235 is not interrupted from running and consequently, the migration is seamless. Once KMD 210 detects all migrations are complete, it unlocks the undock request so that the dockable device 200 can be physically undocked. The application is now running on the iGPU 215 (316) and the UMD 205 and KMD 210 communicate with each other to make sure that nothing is sent to the dGPU 265 in the undocked state but is run on the iGPU 215. In addition, the UMD 205 and KMD 210 can record certain operations so that they can be propagated to the dockable device 200 when the dockable device 200 is docked with the docking station 250.

After the application migration has been completed, and in the case where the dockable device 200 is not docked (308), the KMD 210 continuously checks the docking status and the application 235 will continue run on the iGPU 215 (317) until the KMD 210 determines that the dockable device 200 is docked to the docking station 250 (319). If the dockable device 200 is docked, the KMD 210 will inform or notify the UMD 205 about the docking event (321). The UMD 205 will react and trigger migration across the GPUs. In particular, the UMD 205 will migrate or push the application 235 and all other required information and data from the iGPU 215 in the dockable device 200 to the dGPU 265 in the docking device 250. In general, the application migration requires at least opening graphics adaptors, creating DX devices in the dGPU 265, providing the proper state and data information for the dGPU pipeline, and copying the context and environment to the dGPU 265 so that the application 235 sees everything identically. That is, the application migration is transparent to the application 235. As stated above, the application 235 is not interrupted from running and consequently, the migration is seamless.

Described herein are example embodiments for implementing migration application. As stated herein, when a detachable graphics profile indicates that an application should run on the dGPU in a detachable graphics configuration, the UMD will require some modifications. For example, an additional thread will be created that will wait for notification from the KMD that a dock or undock event is requested. That is, when application migration is enabled, the UMD creates an extra thread to check for KMD notifications of a dock or undock event. When the notification is detected by the extra thread, the extra thread tells the rest of the UMD (the part that exists whether or not app migration is enabled) to perform the migration. All resources, shaders, views and the like will be created on the iGPU (or APU) whether docked or undocked and created on the dGPU if docked. All information needed to create the resources, shaders, views, and the like on the dGPU when the dGPU is available upon docking will be remembered and stored, for example in memory 212. This information may be kept as a list of all resources, shaders, views, etc. All data loads from the application will be sent to the iGPU (or APU) and the dGPU (if currently docked). This is done to minimize the amount of data that needs to be transferred when undocking. The above noted information can be stored in the UMD using memory 212.

Referring also to FIGS. 2 and 3 for purposes of time and event sequencing, when the additional thread detects that an undock is requested, (see for example (313) in FIG. 3), the KMD (e.g. KMD 210) will issue a notification to the UMD (e.g. UMD 205) about the undock event. In particular, the KMD will issue a command telling the UMD to migrate to the iGPU (or APU), (e.g. iGPU 215). Upon detecting the undock event, the UMD will lock a critical section to prevent more device driver interface (DDI) calls from, for example a Microsoft® runtime program, to the UMD, migrate to iGPU, and then release the critical section.

To migrate from the dGPU, (e.g. dGPU 265), to the iGPU (or APU), the list of resources, shaders, views, and the like will be reviewed and identified accordingly, (see for example (315) in FIG. 3). The UMD keeps track of which GPU has the latest content of a resource when the application is running on the dGPU. Upon migration to the iGPU, (see for example (315-316) in FIG. 3), for resources whose latest content only reside on the dGPU, the UMD will transfer their contents from the dGPU to the iGPU (or APU). The dGPU copies of the resources, shaders, views, and the like will be destroyed along with the scheduling contexts on the dGPU. When the KMD sees that there are no resources or scheduling contexts on the dGPU, it will allow the undock. Once the migration to the iGPU (or APU) is complete, the UMD state will be in the same state as it would have been if the application was started in an undocked state. As described herein, the KMD will maintain a virtual or phantom dGPU even when undocked so that the UMD will be able to query the adapter info and the like from the dGPU.

When the additional thread detects that a dock is requested, (see for example (319) in FIG. 3), the KMD will issue a command telling the UMD to migrate to the dGPU. To migrate to the dGPU, the scheduling contexts will be created on the dGPU. A review and identification of the resources, shaders, views, and the like will be undertaken. The resources will be created, the shaders will be compiled, and the views, and the like will be created on the dGPU. The contents of the resources will not be transferred when migrating to the dGPU. The UMD will transfer the resources to the dGPU, if necessary, when they are next used.

Described herein is a method for configuration determination, (see for example FIG. 3). In general, upon launch of the application and a request to open an adapter, the UMD sends a query to the KMD as to whether the system or platform supports a detachable graphics configuration, (the KMD knows the system configuration information). If the detachable graphics configuration is supported, application migration will be enabled. In an embodiment, a capability flag can be set if application migration is supported.

In another embodiment, a requirement flag is set depending on whether the application requires application migration. In the event, that the requirement flag is set to require application migration and the capability flag is set to indicate no support, the UMD can override the requirement flag in view of the capability flag and the application will run on the iGPU (or APU).

As stated herein, the KMD will be queried by the UMD to determine whether the initial state is docked or undocked and sets the pass through GPU appropriately. There is a potential race condition with this since the system may undock between the time the query is sent for the initial state and create the GPU device on the dGPU to prevent the undock. The device initialization code will handle failure when creating the GPU device on the dGPU and switch to running on the iGPU (or APU).

Described herein is an implementation for determining driver capabilities. When application migration is supported, the UMD will report the common capabilities of the iGPU (or APU) and dGPU. For a graphics API, one of the first events that occurs when an application launches is that the DX runtime program or an equivalent will query the UMD about the capability of the GPU and in this case, the capabilities of the iGPU (or APU) and the dGPU since the application has to be able to run on both GPUs. Consequently, the common capabilities are reported or determined. This capability inquiry requests information about software and hardware capabilities.

Described herein is a method for protecting critical sections. In this method, the DirectX11 (DX11) free threading entry points will be used independent of whether the application requires free threading. This is needed because the entry points need to be protected with a critical section to allow safe interaction with the thread that is waiting for the migration notification. That is, if application migration is in progress or will be performed, then critical section protection will be invoked, (see for example (313 and 319) in FIG. 3).

In general, DX11 can call into the UMD via different threads. As stated above, the UMD will spawn an additional thread to monitor docking and undocking signals from the KMD. The UMD will perform certain actions in response to the signal, which can result in modifications of the UMD internal state. Consequently, there is a need to ensure that the monitoring thread does not get tampered with or broken due to conflicts with threads running for the application. In an embodiment, synchronization objects can be used. A critical section object provides synchronization that can be used only by the threads of a single process. A critical section object can be owned by only one thread at a time, which makes it useful for protecting a shared resource from simultaneous access.

Described herein is an entry point for triggering application migration, (see for example (313 and 319) in FIG. 3). A new entry point to trigger a migration will be added in UMD to handle migration, and follow the standard flow of DDI handling as is known to one of ordinary skill in the art. The new entry point will only be called by the thread which is waiting for the migration notification from the KMD. That is, the new entry point will be called once the KMD detects and notifies the UMD. When the UMD detects the notification to migrate between the GPUs, the UMD: 1) locks the critical section so that other DDI calls are on hold; 2) executes the migration; and (3) releases the critical section. In particular, all calls into the UMD need to wait until the application migration process is completed as the UMD state will undergo changes during the process. The UMD will transfer the context and resources and then destroy the contexts on the previous GPU. Once the KMD is aware that the contexts on the previous GPU has been destroyed, (for example, via notification from the UMD), the KMD will allow the previous GPU to detach.

If UMD uses a threading technique to optimize the performance of handling DDI calls, for instance, a producer-consumer model, the migration call may be batched to the consumer thread to reduce the lock time of other coming DDI calls. In such case, the batched migration operation should be flushed to the consumer thread before returning from the migration entry point function, in order to minimize the delay in starting the migration process.

Described herein is how to handle free threading with respect to application migration. In DX11, free threads do not need to wait for other threads to perform. Free threads do not need to stall the existing work of another thread before acting. In other words, multiple threads can call the same function at the same time. This is problematic with respect to application migration.

DX11 free threading allows create DDI calls to be made by threads other than the application's main rendering thread. If create DDI calls operate completely independently of the main rendering thread, (threads with entry point multi-threading), they don't know the current docked or undocked state and don't know whether to create the resource on the dGPU.

Described herein are two example methods for addressing the above. In an example method, the UMD will only create the objects on the iGPU (or APU) during the create DDI call. The UMD will then create the object on the dGPU on demand when the object is needed on the dGPU by the main thread. This method allows the create DDI calls to operate without synchronization but depends on the implementation of recreating objects on the dGPU during iGPU (or APU) to dGPU migration.

In another method, synchronization is used. The create DDI calls will own the DDI critical section. This prevents other DDI calls including a migration command from occurring during the Create. Additionally, with entry point multi-threading enabled, the create DDI call will need to wait for the last batched migrate command to complete. This mechanism will prevent DDI calls from being made by other threads at the same time. However, except when migrating (a rare event), the consumer thread will be able to continue processing uninterrupted during the create DDI calls.

Described herein is the application migration detection thread. This is the thread referred to above that is created for monitoring for the KMD signal, i.e. the UMD spawns a thread for application migration detection. This thread will do an initial query of the docked state, migrate based on the initial state if necessary, then go into a loop waiting for dock or undock events and then migrate when an event occurs. An example flowchart was described herein above with respect to FIG. 3.

An example logic of the application migration detection thread is described with respect to Table 1. An initial state of the iGPU and dGPU relationship is obtained. In the event that the state indicates that the GPUs are docked, then migration from the iGPU to the dGPU is implemented. The system then waits for an undock event or an exit event. An "exit" event will be used by the main thread to notify the application migration thread to terminate. At the beginning of context and device destruction, the exit event will be signaled, and then the application migration detection thread will be released. In the event that the state indicates that the GPUs are undocked, then migration from the dGPU to the iGPU is implemented and the system then waits for a dock event or an exit event.

TABLE 1

```
while (1)
{
    state = GetState;
    if (state == docked)
    {
        success = Immediately create graphics scheduler contexts on
        dGPU;
        if (success)
        {
            batch migrate to dGPU;
        }
        else
        {
            state = undocked;
        }
    }
    else
    {
        assert(state == undocked);
        batch migrate to APU;
    }
    if (state == docked)
    {
        wait until undock event or exit event is signaled;
    }
    else
    {
        assert(state == undocked);
        wait until dock event or exit event is signaled;
    }
    if (exit event is signaled)
    {
        break;
    }
}
```

Described herein is an example implementation on how to create resources, shaders, views, and the like on the iGPU (or APU) depending on whether the dockable device is docked or undocked. To minimize migration time when migrating from the dGPU to the iGPU (or APU), all resources, shaders, views, and the like will be created on the iGPU (or APU) whether docked or undocked.

Described herein is how to handle static data. In an example implementation, when the dockable device is docked, a broadcast mechanism is used to upload static data to minimize migration time. In particular, to minimize migration time when migrating from the dGPU to the iGPU (or APU), uploads of static data will be always be sent to the iGPU (or APU) in addition to the render GPU, (i.e. the active GPU).

Described herein is an example implementation of how to maintain the list of resources, shaders, views, and the like. The UMD will keep track of objects, resources, and other relevant information, i.e. the UMD will track Creates and Destroy. The resources will stay in their own list, and another list will be created which holds all of the other object types. The UMD does this tracking so that free threading can be handled correctly to prevent racing conditions as described herein.

Described herein is an example implementation for migration from dGPU to iGPU (or APU). When the UMD is triggered to perform a migration to the iGPU (or APU) and the pass-through GPU is not currently GPU 0, i.e. the iGPU, the following method will be performed. The DDI state will be walked through and all resources and pipeline state objects on the dGPU will be unbound. The list of resources will be walked through and the data of each resource will be transferred to the iGPU (or APU), if iGPU (or APU) does not have its latest content. All resources will be marked as valid only on iGPU (or APU), and their copies on dGPU will be destroyed.

The list of pipeline state objects will be walked through and their copies on dGPU will be destroyed and they are marked as created only on the iGPU (or APU). The UMD's rendering GPU will be changed to iGPU (or APU), so consequent operations will be sent to iGPU (or APU) only afterwards. The UMD device, and its associated contexts and objects (e.g., graphics scheduler contexts, internal memory allocations, synchronization objects, and the like) on GPU 1, (which is the dGPU), will be destroyed. This reflects the fact that the internal UMD driver states need to be updated to indicate that the active GPU is changed to iGPU/APU and that the DDI device on the dGPU is destroyed.

Described herein is what information needs to be remembered to recreate objects on the dGPU. The UMD will determine the nature, type and what data needs to be saved in view of the item being saved, i.e. whether it is shader code or an object. That is, the driver can determine how much data, for example the metadata and code, needs to be stored for recreating the shaders and other structures for application migration. For example, for shader objects this may include the size of the shader code. Memory will be allocated for all create data including the shader codes, IO signatures, etc., based on the shader type and device interface. The state objects, (blend state, rasterizer state, sampler state, depth stencil state and IaLayout state), are handled similarly to shaders. When The UMD creates these objects, the UMD will also store the create data associated with the object. The data can be stored in the form of a data structure or other storage construct. The saved data will be retrieved when it is needed.

Described herein is how to process a query operation in view of application migration. In general, in the event that a query is still in building or in an issued stage and has not ended, and application migration occurs, the UMD needs to track the query status and determine whether complete or partial results are available for the dGPU. For example, a Boolean or flag may be used to indicate whether partial queried results are available. In the event partial results are available, the partial results are stored. In certain cases, partial results are combined. An example implementation is shown in Tables 2 and 3, where the latter Table is an implementation for Direct3D API, but could be modified accordingly for other graphics API.

TABLE 2

Handle query object for dGPU to APU/iGPU, and APU/iGPU to dGPU migration:
    For dGPU to APU/iGPU migration:
        - "Current GPU" is dGPU.
        - "New GPU" is APU/iGPU.
    For APU/iGPU to dGPU migration:
        - "Current GPU" is APU/iGPU.
        - "New GPU" is dGPU.
    During the migration, UMD walks through each query object and do the following:
    1. If the query object's current state is in building state:
        a. Generate an End( ) call on "current GPU" to complete the building.
        b. Wait for End( ) call complete and call GetData on "current GPU" until the query
           object is signaled. Save the partial query result to the query object and set a Boolean
           flag "PartialResult" to indicate that migration occurred when the query wasn't
           signaled.
             i. If partial result already exists, we need to save off old partial result before
               the internal GetData calls, and combine the old results with new partial
               result, and save off the new combined results.
        c. Generate Begin( ) call on "new GPU".
    2. If the query object's current state is issued or signaled:
        a. If UMD already got complete query data saved off, no special handling is needed.
        b. If End( ) was previously called on "new GPU", no special handling is needed since
           "future GPU" has the complete query data and consequent GetData( ) call will be
           routed to "new GPU".
        c. If it is not one of the 2 cases above:
           i. Wait for End( ) call complete and call GetData on "current GPU" until the
             query object transitions to signaled state. Save the query data..
           ii. Set...the "PartialResult" flag as FALSE since driver already has complete
             query result. .
           iii. Mark the query's state as signaled.
    3. For dGPU to APU/iGPU migration, destroy the query on dGPU.
Handle migration in GetData( ):
    - If the query object is in signaled state, and the complete query data is available, just copy the
      query data to output and return. .
    - If the query object is in issued state, and only partial data is available ("PartialResult" flag is
      TRUE):
        ○ Get data as normal.
        ○ If final result of GetData( ) is OK, and outputs does return query data:
           ■ Set "PartialResult" flag to FALSE.
           ■ Combine the saved off partial results to the new output as described in Table
             3. Then free memory of partial results.
Otherwise follow normal handling of GetData( ).

TABLE 3

| Query type | Data type | Operation |
|---|---|---|
| OCCLUSION | UINT64 | Add the old and new data |
| OCCLUSION_PREDICATE | BOOL | OR the old and new data |
| TIMESTAMP_DISJOINT | D3D10_DDI_QUERY_DATA_TIMESTAMP_DISJOINT | Return "Frequency" from old data. Set "Disjoint" to TRUE |
| PIPELINE_STATS | D3D10_DDI_QUERY_DATA_PIPELINE_STATICS/ D3D11_DDI_QUERY_DATA_PIPELINE_STATICS | Add old and new data for each field in the output struct |
| SO_STATS SO_STATS_STREAM# | D3D10_DDI_QUERY_DATA_SO_STATICS | Add old and new data for each field in the output struct |
| SO_OVERFLOW_PREDICATE SO_OVERFLOW_PREDICATE_STREAM# | BOOL | OR the old and new data |
| >=COUNTER_DEVICE_DEPENDENT0 | Defined by IHV | Defined by IHV |

Described herein is how offer and reclaim of resources is handled. In general, applications/programs and/or graphics runtime keep track of memory conditions. In the event of low memory conditions, the UMD is requested to release memory of some idling API object. This is termed an offer. UMD will then release memory for re-use. Note that the API object is still present. When the previously offered API object is needed again, the memory is re-associated with the API object. This is termed a reclaim. The question which arises is what happens if application migration occurs between an offer and reclaim. In an embodiment, the UMD will track the offers and the GPUs making the offers. Therefore when a reclaim occurs, the UMD can do the Reclaim based on the offered GPU.

Described herein is migration from iGPU (or APU) to dGPU. A GPU device will be created on dGPU. The lists of resources, shaders, etc. will be walked through to create on the dGPU. The instances will be kept on the iGPU (or APU) for potential migration back to the iGPU (or APU). Note that content of resources are not immediately propagated to dGPU during migration, and the propagation will be done on demand when the resources are needed on dGPU. The rendering GPU will be changed from iGPU (or APU) to dGPU, and the pipeline states will be rebound, (send current pipeline states to dGPU). The handling of query object is the same as in the dGPU-to-iGPU migration as described herein above. In the event of critical failures, (e.g., out of memory failure), the migration operations will be undone, and the application will remain running on APU/iGPU.

In general and without limiting embodiments described herein, a method for application migration includes determining a docking state of a dockable device while at least an application is running, initiating application migration from the dockable device to a docking station on a condition that the dockable device is in a docked state, wherein the dockable device includes a processor and the docking station includes a high-performance processor. The method further includes initiating application migration from the docking station to the dockable device on a condition that the dockable device is moving to an undocked state, wherein the application continues to run during the application migration from the dockable device to the docking station or during the application migration from the docking station to the dockable device.

In an embodiment, the method includes maintaining all data required to recreate an application state on a transferee processor, wherein the processor regardless of docked state has the data to minimize data transfer when undocking. In an embodiment, the method includes destroying state information on a transferor processor. In an embodiment, the method includes maintaining a virtual high-performance processor on the dockable device on a condition that the dockable device is in an undocked state.

In an embodiment, a user mode driver and a kernel mode driver ensures that no work is sent to the virtual high-performance processor. In an embodiment, the method includes a user mode driver and a kernel mode driver records certain operations to be propagated to the dockable device when the dockable device is docked with the docking station In an embodiment, the method includes sending a notification from a kernel mode driver to a user mode driver to initiate application migration on a condition that the kernel mode driver detects a docking event. In an embodiment, the user mode driver locks critical sections during application migration.

In an embodiment, the method includes detecting an undock request, locking the undock request and on a condition that application migration is complete, unlocking an undock request so that the dockable device can be physically undocked.

In an embodiment, the method includes detecting a docking event, initiating application migration from the dockable device to the docking station on a condition that the detected docking event is to dock the dockable device and initiating application migration from the docking station to the dockable device on a condition that the detected docking event is to undock the dockable device.

In general and without limiting embodiments described herein, a dockable device includes a processor, and a kernel mode driver configured to determine a docking state of a dockable device while at least an application is running. The kernel mode driver is configured to initiate application migration from the dockable device to a docking station on a condition that the dockable device is in a docked state, wherein the docking station includes a high-performance processor. The kernel mode driver is further configured to initiate application migration from the docking station to the dockable device on a condition that the dockable device is moving to an undocked state, wherein the application continues to run during the application migration from the dockable device to the docking station or during the application migration from the docking station to the dockable device.

In an embodiment, the dockable device includes a user mode driver, wherein the user mode driver and the kernel mode driver are configured to maintain all data required to recreate an application state on a transferee processor, wherein the processor regardless of docked state has the data to minimize data transfer when undocking.

In an embodiment, the user mode driver is configured to destroy state information on a transferor processor.

In an embodiment, the dockable device includes a user mode driver, wherein the user mode driver and the kernel mode driver are configured to maintain a virtual high-performance processor on the dockable device on a condition that the dockable device is in an undocked state. In an embodiment, the user mode driver and the kernel mode driver are configured to ensure that no work is sent to the virtual high-performance processor.

In an embodiment, the user mode driver and the kernel mode driver configured to record certain operations to be propagated to the dockable device when the dockable device is docked with the docking station.

In an embodiment, the kernel mode driver configured to send a notification to a user mode driver to initiate application migration on a condition that the kernel mode driver detects a docking event.

In an embodiment, the dockable device includes a user mode driver configured to lock critical sections during application migration.

In an embodiment, the kernel mode driver is configured to detect an undock request, the kernel mode driver is configured to lock the undock request and on a condition that application migration is complete, the kernel mode driver is configured to unlock an undock request so that the dockable device can be physically undocked.

In general and without limiting embodiments described herein, a computer readable non-transitory medium including instructions which when executed in a processing system cause the processing system to execute a method for application migration, the method including determining a docking state of a dockable device while at least an application is running, initiating application migration from the dockable device to a docking station on a condition that the dockable device is in a docked state, wherein the dockable device includes a processor and the docking station includes a high-performance processor and initiating application migration from the docking station to the dockable device on a condition that the dockable device is moving to an undocked state, wherein the application continues to run during the application migration from the dockable device to the docking station or during the application migration from the docking station to the dockable device.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for application migration, the method comprising:
   determining a docking state of a lockable device while at least an application is running;
   responsive to detecting that the dockable device is in a docked state, initiating an application migration from the dockable device to a docking station, wherein the dockable device includes a processor and the docking station includes a high-performance processor; and
   responsive to detecting that the dockable device is moving to an undocked state, initiating an application migration from the docking station to the dockable device,
   wherein the application continues to run during the application migration from the dockable device to the docking station or during the application migration from the docking station to the dockable device, and
   wherein a user mode driver locks one or more critical sections during either application migration.

2. The method of claim 1, further comprising:
   maintaining all data required to recreate an application state on a transferee processor, wherein the transferee processor, regardless of whether the dockable device is in the docked state or in the undocked state, has the data to minimize data transfer when undocking.

3. The method of claim 2, further comprising:
   destroying state information on a transferor processor.

4. The method of claim 1, further comprising:
   responsive to the dockable device being in the undocked state, maintaining a virtual high-performance processor on the dockable device.

5. The method of claim 4, wherein the user mode driver and a kernel mode driver ensuring that no work is sent to the virtual high-performance processor.

6. The method of claim 4, wherein the user mode driver and a kernel mode driver recording certain operations to be propagated to the dockable device.

7. The method of claim 1, further comprising:
   detecting a docking event; and
   sending a notification from a kernel mode driver to the user mode driver to initiate the application migration from the dockable device to the docking station.

8. The method of claim 1, further comprising:
   detecting an undock request;
   locking the undock request; and
   unlocking the undock request so that the dockable device can be physically undocked after the application migration from the docking station to the dockable station is complete.

9. The method of claim 1, further comprising:
detecting a docking event;
initiating the application migration from the dockable device to the docking station in response to detecting that the docking event is to dock the dockable device; and
initiating the application migration from the docking station to the dockable device in response to detecting that the docking event is to unlock the dockable device.

10. A dockable device, comprising:
a processor;
a user mode driver;
a kernel mode driver configured to determine a docking state of a dockable device while at least an application is running;
the kernel mode driver configured to initiate an application migration from the dockable device to a docking station on a condition that the dockable device is in a docked state, wherein the docking station includes a high-performance processor;
the kernel mode driver configured to initiate an application migration from the docking station to the dockable device on a condition that the dockable device is moving to an undocked state; and
the user mode driver and the kernel mode driver are configured to ensure that no work is sent to a virtual high-performance processor which is maintained on the dockable device on a condition that the dockable device is in the undocked state,
wherein the application continues to run during the application migration from the dockable device to the docking station or during the application migration from the docking station to the dockable device.

11. The dockable device of claim 10,
wherein the user mode driver and the kernel mode driver are further configured to maintain all data required to recreate an application state on a transferee processor, wherein the transferee processor, regardless of whether the dockable device is in the docked state or in the undocked state has the data to minimize data transfer when undocking.

12. The dockable device of claim 11, further comprising:
the user mode driver is further configured to destroy state information on a transferor processor.

13. The dockable device of claim 10, wherein the user mode driver and the kernel mode driver are further configured to maintain the virtual high-performance processor on the dockable device.

14. The dockable device of claim 13, further comprising:
the user mode driver and the kernel mode driver are further configured to record certain operations to be propagated to the dockable device on a condition that the dockable device is in the docked state.

15. The dockable device of claim 10, further comprising:
the kernel mode driver is further configured to send a notification to the user mode driver to initiate the application migration on a condition that the kernel mode driver detects a docking event.

16. The dockable device of claim 10, wherein
the user mode driver is further configured to lock one or more sections critical sections during either application migration.

17. The dockable device of claim 10, wherein:
the kernel mode driver is further configured to:
detect an undock request;
lock the undock request; and
on a condition that the application migration from the docking station to the dockable device is complete, unlock the undock request so that the dockable device can be physically undocked.

18. A computer readable non-transitory medium including instructions which when executed in a processing system cause the processing system to execute a method for application migration, the method comprising the steps of:
determining a docking state of a dockable device while at least an application is running;
responsive to detecting that the dockable device is in a docked state, initiating an application migration from the dockable device to a docking station, wherein the dockable device includes a processor and the docking station includes a high-performance processor;
responsive to detecting that the dockable device is moving to an undocked state, initiating an application migration from the docking station to the dockable device;
locking critical sections during either application migration; and
wherein the application continues to run during the application migration from the dockable device to the docking station or during the application migration from the docking station to the dockable device.

* * * * *